(12) United States Patent
Inoue

(10) Patent No.: US 8,228,095 B2
(45) Date of Patent: Jul. 24, 2012

(54) COMMUNICATION DEVICE

(75) Inventor: Takahiro Inoue, Kanagawa (JP)

(73) Assignee: Renesas Electronics Corporation, Kawasaki, Kanagawa (JP)

( * ) Notice: Subject to any disclaimer, the term of this patent is extended or adjusted under 35 U.S.C. 154(b) by 28 days.

(21) Appl. No.: 12/926,956

(22) Filed: Dec. 20, 2010

(65) Prior Publication Data

US 2011/0148470 A1 Jun. 23, 2011

(30) Foreign Application Priority Data

Dec. 21, 2009 (JP) ................................. 2009-289247

(51) Int. Cl.
*H03K 5/22* (2006.01)
(52) U.S. Cl. .......................................... 327/65; 327/63
(58) Field of Classification Search .................... 327/63, 327/65, 74, 77
See application file for complete search history.

(56) References Cited

U.S. PATENT DOCUMENTS

| | | | |
|---|---|---|---|
| 6,417,776 B1* | 7/2002 | Tagishi | 340/635 |
| 7,208,981 B1* | 4/2007 | Ziazadeh et al. | 327/65 |
| 7,808,282 B2* | 10/2010 | Cheung | 327/63 |
| 7,944,246 B2* | 5/2011 | Uchiki | 327/58 |
| 2011/0131345 A1* | 6/2011 | Payrat et al. | 710/16 |

FOREIGN PATENT DOCUMENTS

JP 2009-65235 A 3/2009

OTHER PUBLICATIONS

Universal Serial Bus Specification Revision 2.0. Chapter 7 Electrical, pp. 119-194, Apr. 27, 2000.

* cited by examiner

*Primary Examiner* — Quan Tra
(74) *Attorney, Agent, or Firm* — McGinn IP Law Group, PLLC

(57) ABSTRACT

According to an exemplary aspect of the present invention, it is possible to provide a communication device that can prevent misdetection of a disconnection and achieve a high output level on a receptacle side. In the communication device, a reference voltage generating circuit outputs a reference voltage that changes according to a first control signal. A differential amplifier circuit amplifies input signals and outputs differential output signals, the voltages of which change according to a second control signal, to a receptacle. A disconnection detector circuit outputs a disconnection detecting signal when a differential amplitude voltage between the differential output signals is equal to or higher than the reference voltage. The reference voltage generating circuit outputs the reference voltage that is larger than the differential amplitude voltage when the receptacle is terminated and that is smaller than the differential amplitude voltage when the receptacle is opened.

5 Claims, 9 Drawing Sheets

COMMUNICATION DEVICE

INCORPORATION BY REFERENCE

This application is based upon and claims the benefit of priority from Japanese patent application No. 2009-289247, filed on Dec. 21, 2009, the disclosure of which is incorporated herein in its entirety by reference.

BACKGROUND

1. Field of the Invention

The present invention relates to a communication device, and in particular to a communication device that detects a disconnection.

2. Description of Related Art

A USB (Universal Serial Bus) standard has been widely used as an interface to interconnect various media devices. Interfaces using the USB standard are incorporated in various sets depending on a medium to be used by users. A standard of a transmitting-waveform in a HS (High Speed) mode in the USB 2.0 standard is specified at each of a near-end of an output terminal side and a far-end of a receptacle terminal side through a transmission path. Then, Communication quality is ensured by guaranteeing these standards.

However, recently, the USB standard is incorporated in devices for various use, and the usage of the USB standard has been diversified. As a result, the devices incorporating the USB standard have been interconnected in many cases without involving a personal computer. Therefore, in order to achieve a high communication quality adapted to various usage environments, more users wish to guarantee a transmitting-waveform in a near-end standard on a receptacle side. Accordingly, there is an increasing demand for developing a device that can perform a communication that satisfies the near-end standard, when a waveform loss due to an effect of a transmission path between an interface communication device and a receptacle in a set incorporating the USB standard is taken into consideration.

Here, the USB standard is described. A USB is a two-wire communication bus. The USB 2.0 standard is a communication standard which supports three transmission modes of High Speed (HS), Full Speed (FS), and Low Speed (LS) (Universal Serial Bus Specification Revision 2.0 pp. 119-194). The USB 2.0 standard has a specification that includes a HS transmitting circuit, a squelch detector circuit; and a disconnection detector circuit. The HS transmitting circuit outputs the transmitting-waveform when a HS communication is performed. The squelch detector circuit detects a received signal intensity. The disconnection detector circuit detects that an opposite device is opened. When the output level is 360 mV to 440 mV, the detection sensitivity of the squelch is specified in the range of 100 mV to 150 mV and the detection sensitivity of the disconnection is specified in the range of 525 mV to 625 mV.

FIG. 7 is a block diagram showing a connection between a transmitting-side device and a receiving-side device in a HS mode of the USB 2.0 standard. Signals DP and DM constituting a pair of differential signals are terminated at 45Ω in each of the transmitting-side device and the receiving-side device. The HS transmitting circuit is specified to drive a current which makes a differential signal amplitude be about 400 mV when a combined resistance between the transmitting-side and the receiving-side is 22.5Ω. Further, when the receiving-side device is removed, the differential signal amplitude becomes 800 mV which is about twice as large as that described above. Disconnection detection is made to judge whether the device is removed or not by detecting a differential amplitude level. A disconnection detector circuit 70 detects the differential signal amplitude between the signals DP and DM on the output side of the HS transmitting circuit, and judges whether the device is removed or not based on the intensity of the differential signal amplitude.

FIG. 8 is a graph showing a general waveform when a SOF (Start of Frame) packet is transmitted in the HS mode of the USB 2.0 standard. A horizontal axis in FIG. 8 represents time. A vertical axis in FIG. 8 represents a voltage level that is differentially amplified. The packet includes a SYNC pattern of 55 to 115 nsec and an EOP (End of Packet) pattern of 175 to 255 nsec. In this way, the differential amplitude level greatly varies between a minimum inversion span such as the SYNC pattern (frequency of 240 MHz) and a non-inversion span such as the EOP pattern (frequency of 6 MHz) depending on frequency characteristics of an amplifier. For this reason, the USB 2.0 standard is specified such that the disconnection detection is performed in the EOP pattern in which the amplitude is stable.

FIG. 9 is a circuit diagram of a disconnection detector circuit 200 in the USB 2.0 standard disclosed in Japanese Unexamined Patent Application Publication No. 2009-65235. A voltage difference between the signals DP and DM is amplified by a first differential amplifier 21a in the disconnection detector circuit 200. The amplified voltage difference is output to a subtractor 22a. A voltage difference between the signals DM and DP is amplified by a second differential amplifier 21b. The amplified voltage difference is output to a subtractor 22b. A DA converter 26 outputs a reference voltage based on input data (predetermined value DAC Data). The reference voltage is amplified by a third differential amplifier 21c (a circuit manufactured by so-called "replica" method) having the same characteristics as those of the first and second amplifiers. The amplified voltage is output to the subtractors 22a and 22b. The subtractor 22a subtracts the output of the differential amplifier 21c from the output of the differential amplifier 21a, and outputs the subtracted output to a zero-cross comparator 23a. The subtractor 22b subtracts the output of the differential amplifier 21c from the output of the differential amplifier 21b, and outputs the subtracted output to a zero-cross comparator 23b. An OR circuit 24 performs an OR operation on the outputs of the zero-cross comparators 23a and 23b. The output of the OR circuit 24 is latched based on a latch timing signal LT by a latch 25 and output as a disconnection detecting signal LO. The latch timing signal LT is output at the end of the EOP span of the SOF packet.

SUMMARY

However, the present inventor has found a problem described below. That is, a signal is attenuated by being transmitted from an output terminal to a receptacle through a plurality of cables or the like, even if the signal has an output waveform conforming to the USB standard (near-end standard) at the output terminal of a general communication device conforming to the USB 2.0 standard. As a result, the rising and falling waveforms in the receptacle become dull, so that the USB standard (near-end standard) cannot be satisfied.

To satisfy the USB standard (near-end standard) on the receptacle side, it is impossible to take such a countermeasure as to increase an output level of the communication device or the like. However, when the output level is increased and exceeds the disconnection detecting standard (525 mV), a disconnection is detected by a general disconnection detector circuit even if it is actually in a connecting state. In sum, the disconnection is incorrectly detected when the output level of the communication device is increased to the disconnection detecting standard or higher, so that communications cannot be performed properly.

A first exemplary aspect of the present invention is a communication device including: a reference voltage generating circuit that outputs a reference voltage, the reference voltage changing according to a first control signal; a differential amplifier circuit that amplifies input signals and outputs the amplified signals as differential output signals to a receptacle, voltages of the differential output signals changing according to a second control signal; and a disconnection detector circuit that judges that the receptacle is opened and outputs a disconnection detecting signal when a differential amplitude voltage between the differential output signals is equal to or higher than the reference voltage, in which the reference voltage generating circuit outputs the reference voltage that is larger than the differential amplitude voltage when the receptacle is terminated and that is smaller than the differential amplitude voltage when the receptacle is opened.

In the communication device according to the first exemplary aspect of the present invention, the reference voltage is maintained at a level higher than the differential amplitude voltage by the first control signal and the second control signal when the receptacle is terminated. Thus, even if an output level (the differential amplitude voltage) in the receptacle is increased, the disconnection detecting signal is prevented from being erroneously output.

According to an exemplary aspect of the present invention, it is possible to provide a communication device that can prevent misdetection of a disconnection and achieve a high output level on a receptacle side.

BRIEF DESCRIPTION OF THE DRAWINGS

The above and other exemplary aspects, advantages and features will be more apparent from the following description of certain exemplary embodiments taken in conjunction with the accompanying drawings, in which.

DETAILED DESCRIPTION OF THE EXEMPLARY EMBODIMENTS

Figure 1:
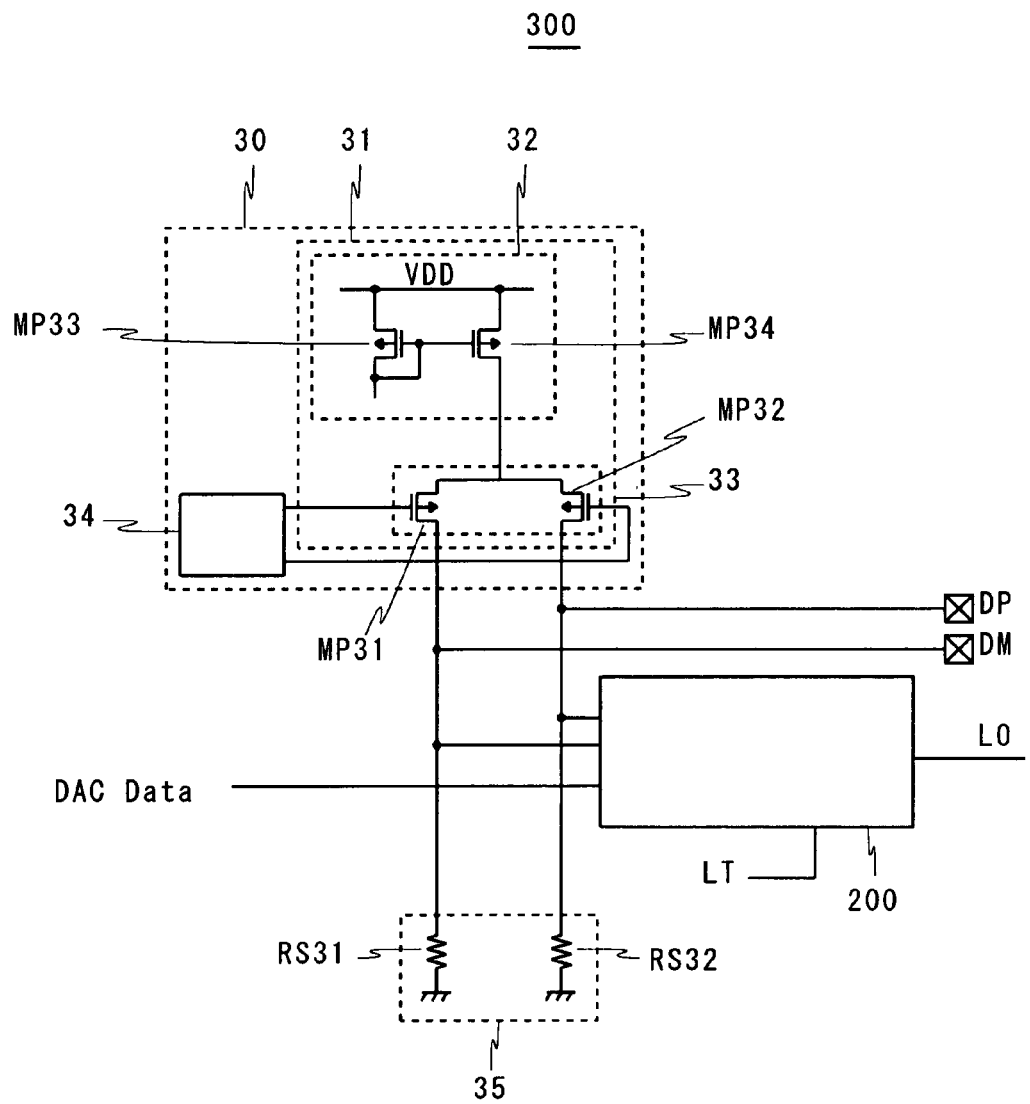
FIG. 1 is a circuit diagram of a communication device serving as an example of a communication device in which a general HS transmitting circuit is added to a disconnection detector circuit conforming to the USB 2.0 standard.
Figure 9:
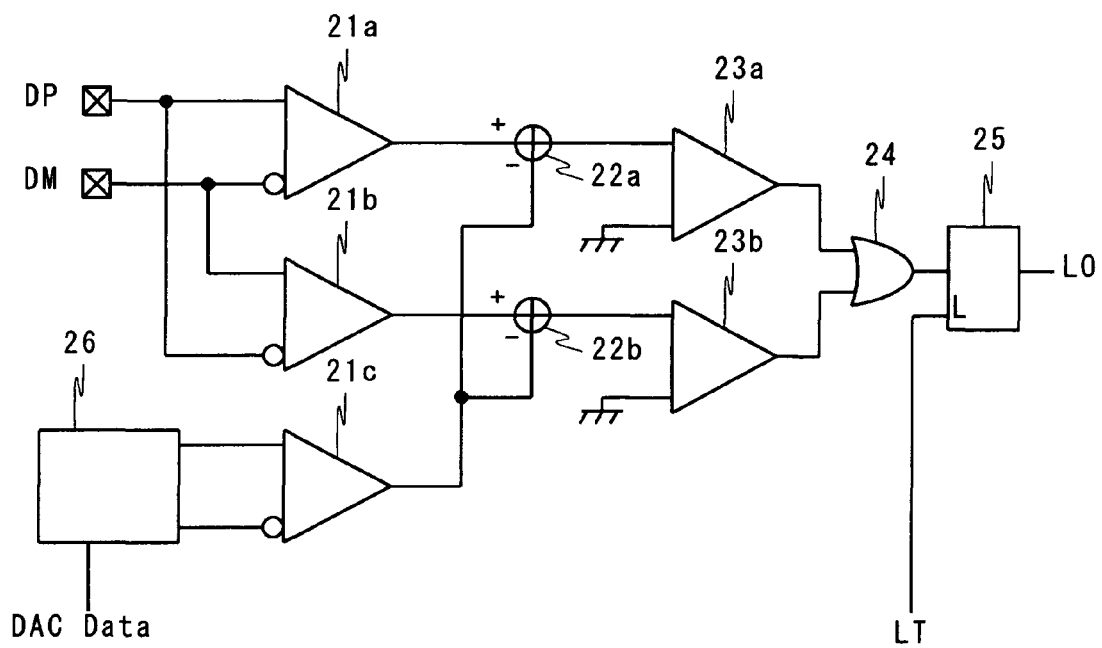
FIG. 9 is a circuit diagram of a disconnection detector circuit 200 in a USB 2.0 standard disclosed in Japanese Unexamined Patent Application Publication No. 2009-65235.

First, as a prerequisite for understanding the present invention, described below is a mechanism in which an output level on a receptacle side falls even if an output level at an output terminal of a general communication device conforming to the USB 2.0 standard conforms to a near-end standard. Hereinafter, an explanation is provided by using a communication device shown in a circuit diagram of FIG. 1 which is illustrated by the present inventor as an example. FIG. 1 is a circuit diagram of a communication device 300 that is an example of a communication device in which a general HS transmitting circuit is added to a disconnection detector circuit conforming to the USB 2.0 standard. In the communication device 300, an output of a HS transmitting circuit 30 is connected to an input of a disconnection detector circuit 200 shown in FIG. 9, for example, by wired connection.

The HS transmitting circuit 30 includes a HS output stage 31 and an output stage driver circuit 34. The HS output stage 31 includes a constant current circuit 32 and a differential output circuit 33. The constant current circuit 32 is a current mirror circuit constituted by Pch transistors MP33 and MP34. The sources of the Pch transistors MP33 and MP34 are connected to a power supply VDD. The drain of the Pch transistor MP33 is connected to the gates of the Pch transistors MP33 and MP34. The drain of the Pch transistor MP34 is connected to the sources of Pch transistors MP31 and MP32 which constitute the differential output circuit 33.

The differential output circuit 33 outputs a signal DM from the drain of the Pch transistor MP31 and a signal DP from the drain of the Pch transistor MP32. The output stage driver circuit 34 outputs a data input signal to the differential output circuit 33. The two outputs of the output stage driver circuit 34 are connected to the gates of the Pch transistors MP31 and MP32 of the differential output circuit 33, respectively.

A terminating resistor part 35 includes resistors RS31 and RS32. The signal DP is pulled down by the resistor RS32, and the signal DM is pulled down by the resistor RS31. Thus, an output level (differential amplitude voltage between the signals DP and DM) is determined by a current value of the constant current circuit 32 and the terminating resistor part 35.

Figure 2A:
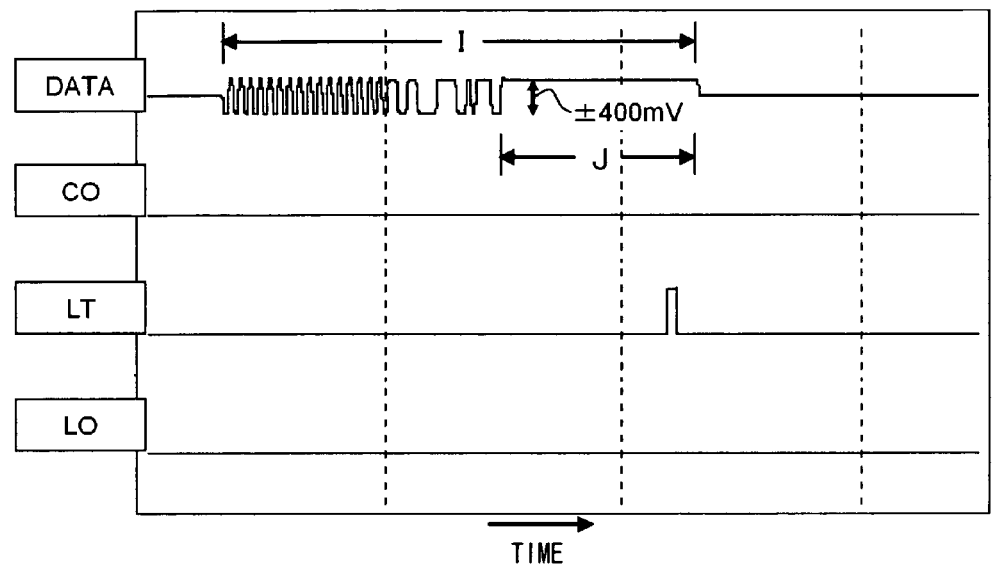
FIG. 2A is a graph showing an operation of a disconnection detector circuit when an opposite device side is terminated.
Figure 2B:
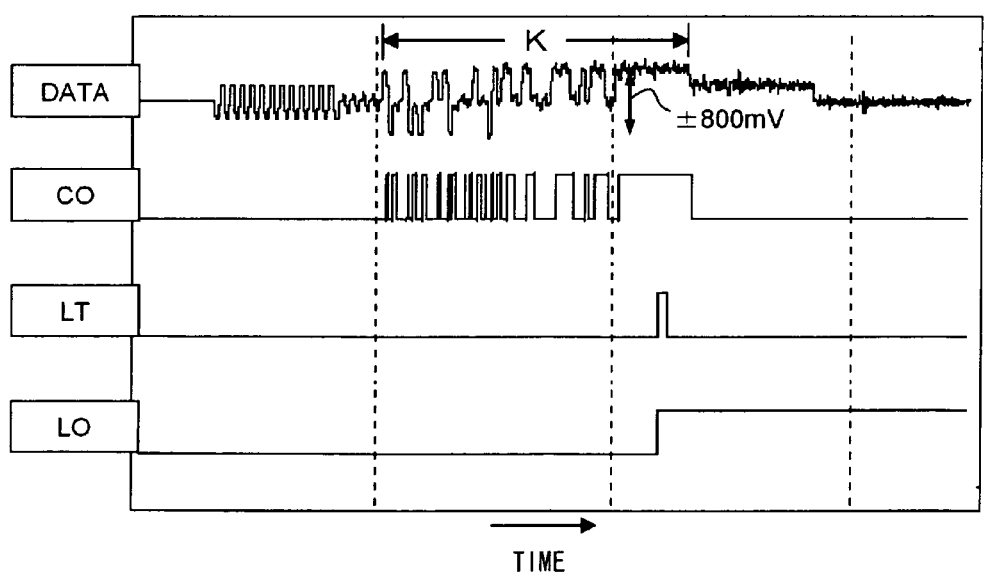
FIG. 2B is a graph showing an operation of a disconnection detector circuit when an opposite device side is open.

FIG. 2A is a graph showing an operation of a disconnection detector circuit when an opposite device side is terminated. FIG. 2B is a graph showing an operation of the disconnection detector circuit when the opposite device side is open. In the case of the disconnection detector circuit 200 shown in FIG. 9, a signal DATA corresponds to the differential amplitude voltage between the signals DP and DM of the disconnection detector circuit 200 shown in FIG. 9. A signal CO corresponds to an output of an OR circuit 24 of the disconnection detector circuit 200 shown in FIG. 9. A latch timing signal LT corresponds to a latch signal of a latch 25 of the disconnection detector circuit 200 shown in FIG. 9. A disconnection detecting signal LO corresponds to an output of the latch 25 of the disconnection detector circuit 200 shown in FIG. 9.

In the USB 2.0 standard, as shown in FIG. 2A, a SOF packet (span I in FIG. 2A) is transmitted as the signal DATA. Then, it is specified that disconnection is detected in an EOP span (span J in FIG. 2A) in the span I. When the opposite device side is terminated (connecting state), as shown in FIG. 2A, the signal CO is fixed at LOW and the disconnection detecting signal LO is maintained as it is. On the other hand, when the opposite device side is open (disconnecting state), as shown in FIG. 2B, an impedance mismatch occurs on a USB 2.0 receptacle side, with the result that a reflective wave overlaps with the SOF in a USB 2.0 output terminal. Thus, the signals DATA amplified by the differential amplifiers 21a and 21b, or a voltage difference between the signals DP and DM, exceeds a reference voltage amplified by a differential amplifier 21c. Then, the signals DATA amplified by differential amplifiers 21a and 21b are compared by zero-cross comparators 23a and 23b. Therefore, the signal CO is changed in a span in which the signal DATA overlaps with the reflective wave (span K in FIG. 2B). As a result, the disconnection detecting signal LO is changed from LOW to HIGH at the timing when the latch timing signal LT is changed from LOW to HIGH. The disconnection is detected by the output level intensity of the transmitting wave in the output terminal as described above.

Figure 3:
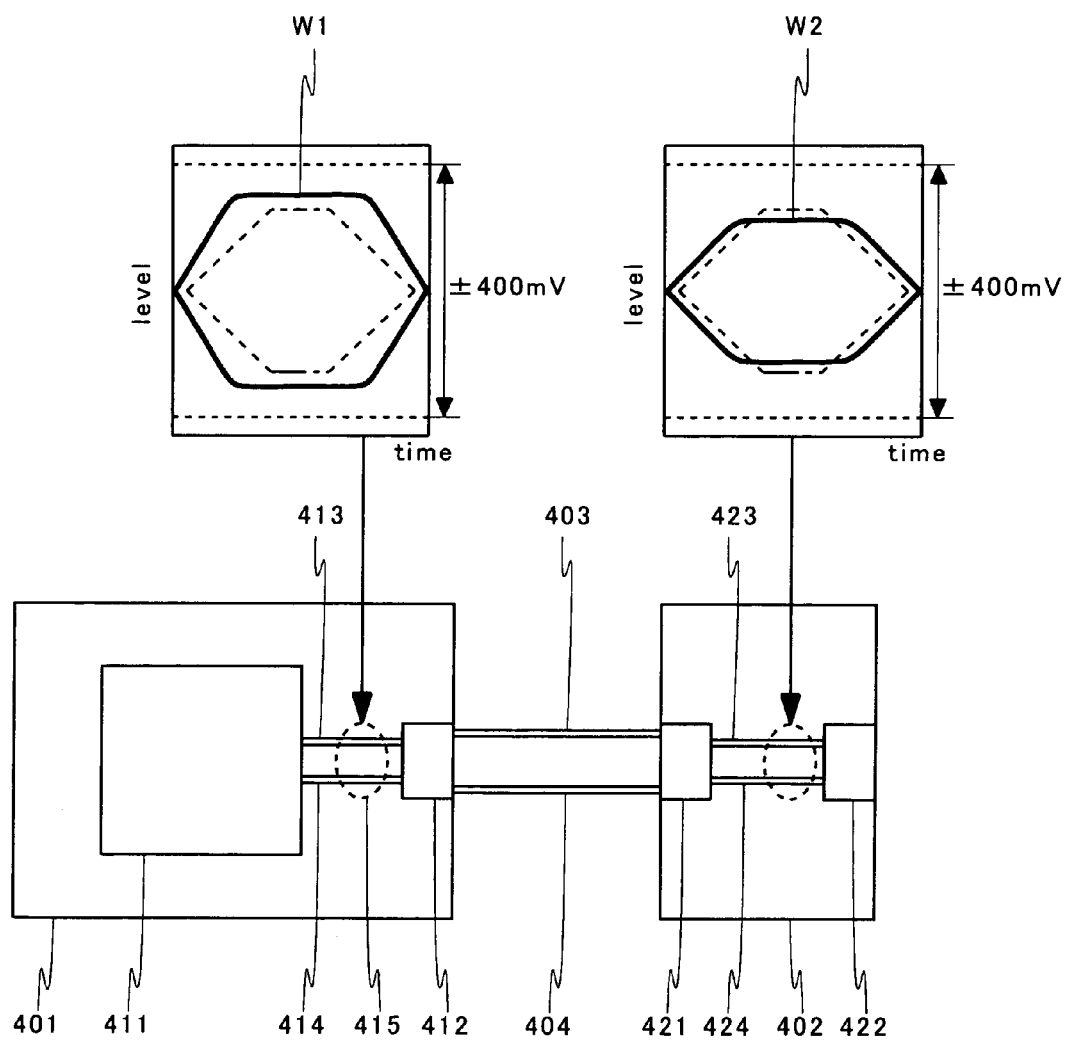
FIG. 3 is a block diagram showing a connection and a waveform diagram between a USB 2.0 output terminal and a USB 2.0 receptacle in the USB 2.0 standard.

FIG. 3 is a block diagram showing a connection and a waveform diagram between the USB 2.0 output terminal and the USB 2.0 receptacle in the USB 2.0 standard. A USB 2.0 device 411 and a connector 412 are mounted on a board 401. The USB 2.0 device 411 is connected to the connector 412 through wirings 413 and 414. A front part of the connector 412 serves as a USB 2.0 output terminal 415. A connector 421 and a USB 2.0 receptacle 422 are mounted on a board 402. The connector 421 is connected to the USB 2.0 receptacle 422 through wirings 423 and 424. The connector 412 on the board 401 is connected to the connector 421 on the board 402 through wirings 403 and 404.

A waveform W1 is a transmitting waveform in the USB 2.0 output terminal 415. A waveform W2 is a transmitting waveform in the USB 2.0 receptacle 422. A horizontal axis represents time and a vertical axis represents a differential output voltage level between the signals DP and DM in each waveform diagram. Further, the USB 2.0 standard is represented by a dashed line.

The USB 2.0 output terminal 415 is connected to the USB 2.0 receptacle 422 through the connector 412, the wirings 403 and 404, the connector 421, and the wirings 423 and 424. Hence, the transmitting waveform is attenuated, and the output level on the USB 2.0 receptacle 422 side falls. Therefore, the waveform W2 cannot conform to the near-end standard on the USB 2.0 receptacle 422 side, even if the waveform W1 conforms to the near-end standard on the USB 2.0 output terminal 415 side.

Further, the type or the number of a connector, a wiring, a board, or the like arranged between the USB 2.0 output terminal 415 and the USB 2.0 receptacle 422 varies depending on the medium to be used. Therefore, it is quite difficult to develop a device that can conform to the near-end standard on the USB 2.0 receptacle side depending on various situations of a transmission path incorporated in each media device.

First Exemplary Embodiment

Figure 4:
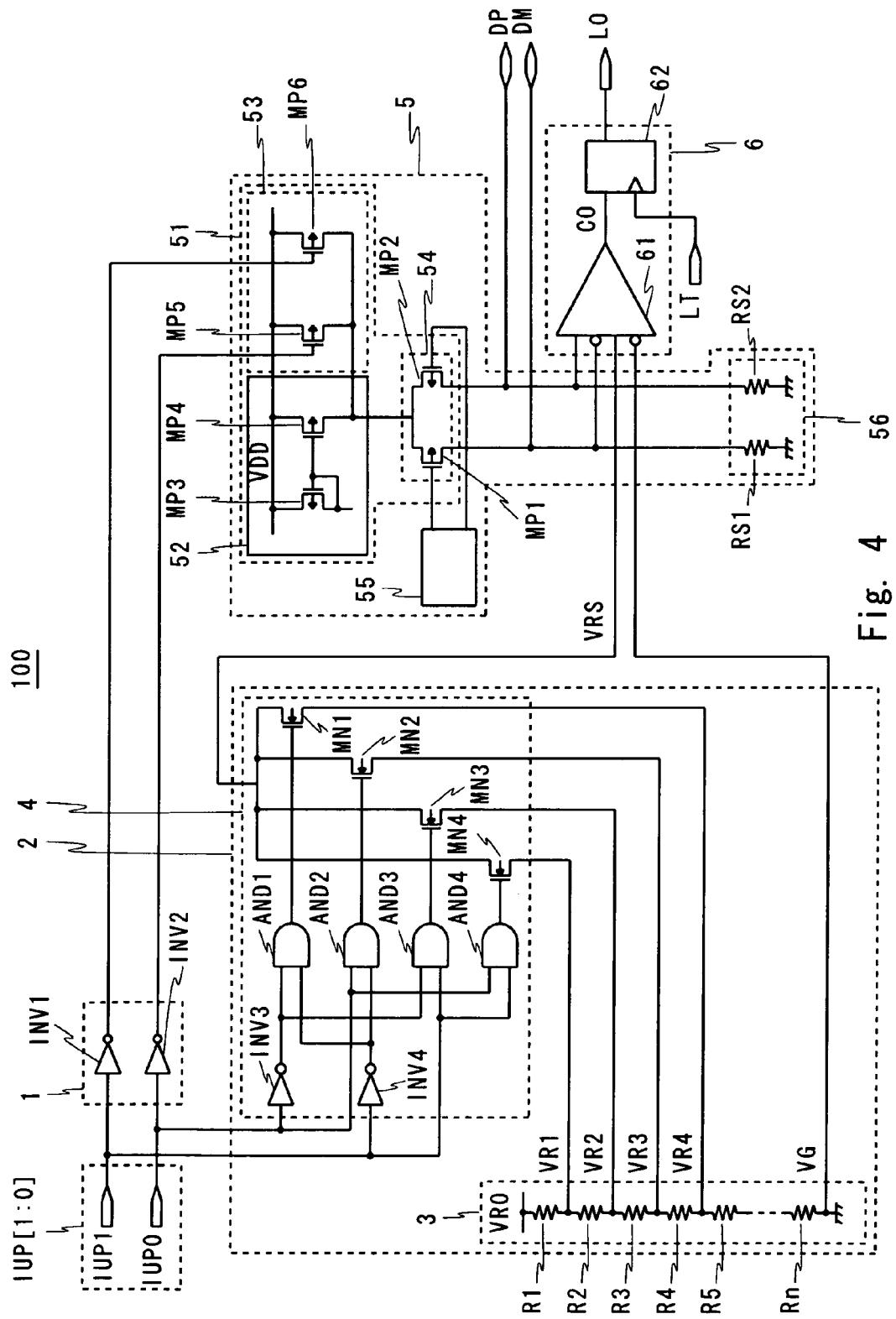
FIG. 4 is a circuit diagram of a communication device 100 according to a first exemplary embodiment.

Exemplary embodiments incorporating the present invention are described hereinafter with reference to the drawings. FIG. 4 is a circuit diagram of a communication device 100 according to a first exemplary embodiment. As shown in FIG. 4, the communication device 100 includes an inverter circuit part 1, a reference voltage generating circuit 2, a differential amplifier circuit 5, and a disconnection detector circuit 6.

The communication device 100 receives an output level control signal IUP[1:0]. The output level control signal IUP[1:0] is a signal to control the reference voltage generating circuit 2 and the differential amplifier circuit 5. The output level control signal IUP[1:0] is a signal constituted by two bits of a higher bit IUP1 and a lower bit IUP0.

The inverter circuit part 1 is connected between the output level control signal IUP[1:0] and the differential amplifier circuit 5 and outputs an inverted signal of the output level control signal IUP[1:0] to the differential amplifier circuit 5. The inverter circuit part 1 includes inverters INV1 and INV2. The inverter INV1 outputs an inverted signal of the higher bit IUP1 to the differential amplifier circuit 5. The inverter INV2 outputs an inverted signal of the lower bit IUP0 to the differential amplifier circuit 5.

The reference voltage generating circuit 2 includes a voltage divider circuit 3 and a sensitivity selector circuit 4. The voltage divider circuit 3 generates voltages VR1 to VR(n−1) by dividing a voltage VR0 by resistors R1 to Rn connected in series between the voltage VR0 and a ground voltage. The sensitivity selector circuit 4 selects one of the voltages VR1 to VR4 supplied from the voltage divider circuit 3 based on the output level control signal IUP[1:0]. Then, the sensitivity selector circuit 4 supplies the selected voltage to the disconnection detector circuit 6 as a reference voltage VRS. The sensitivity selector circuit 4 includes inverters INV3 and INV4, logic circuits AND1 to AND4, and Nch transistors MN1 to MN4. Each of the logic circuits AND1 to AND4 is a two-AND circuit.

The inverter INV3 receives the lower bit IUP0. The inverter INV4 receives the higher bit IUP1. One input of the logic circuit AND1 is connected to the output of the inverter INV3 (the inverted signal of the lower bit IUP0). The other input of the logic circuit AND1 is connected to the output of the inverter INV4 (the inverted signal of the higher bit IUP1). One input of the logic circuit AND2 receives the lower bit IUP0. The other input of the logic circuit AND2 is connected to the output of the inverter INV4 (the inverted signal of the higher bit IUP1). One input of the logic circuit AND3 is connected to the output of the inverter INV3 (the inverted signal of the lower bit IUP0). The other input of the logic circuit AND3 receives the higher bit IUP1. One input of the logic circuit AND4 receives the lower bit IUP0. The other input of the logic circuit AND4 receives the higher bit IUP1. The outputs of the logic circuits AND1 to AND4 are connected to the gates of the Nch transistors MN1 to MN4, respectively. The sources of the Nch transistors MN1 to MN4 receive the voltages VR1 to VR4, respectively. The drains of the Nch transistors MN1 to MN4 are each connected to the disconnection detector circuit 6.

The differential amplifier circuit 5 includes a HS output stage 51, an output stage driver circuit 55, and a terminating resistor part 56. The differential amplifier circuit 5 amplifies a differential signal input from the output stage driver circuit 55. Then, the differential amplifier circuit 5 outputs the amplified differential signal as the signals DP and DM. The HS output stage 51 includes a constant current circuit 52, a constant current variable adjustment part 53, and a differential output circuit 54. The output of the differential amplifier circuit 5 is connected to the input of the disconnection detector circuit 6 by wired connection. Further, the HS output stage 51 and the output stage driver circuit 55 constitute a HS transmitting circuit.

The constant current circuit 52 is a current mirror constituted by Pch transistors MP3 and MP4. The constant current circuit 52 supplies a current to the differential output circuit 54. The sources of the Pch transistors MP3 and MP4 are connected to a power supply VDD. The drain of the Pch transistor MP3 is connected to the gates of the Pch transistors MP3 and MP4. The drain of the Pch transistor MP4 is connected to the drains of Pch transistors MP5 and MP6 of the constant current variable adjustment part 53.

The constant current variable adjustment part 53 includes the Pch transistors MP5 and MP6. The constant current variable adjustment part 53 switches operations of the Pch transistors MP5 and MP6, and adjusts a constant current supplied to the differential output circuit 54, according to a signal input through the inverter circuit part 1 (the inverted signal of the output level control signal IUP[1:0]). The gate of the Pch transistor MP5 is connected to the output of the inverter INV2 of the inverter circuit part 1 (the inverted signal of the lower bit IUP0). The gate of the Pch transistor MP6 is connected to the output of the inverter INV1 of the inverter circuit part 1 (the inverted signal of the higher bit IUP1). The sources of the Pch transistors MP5 and MP6 are connected to the power supply VDD.

In sum, the constant current circuit 52 functions as a constant current source (a first current source). Further, the constant current variable adjustment part 53 functions as a constant current source (a second current source) that adds a constant current controlled by the output level control signal IUP[1:0] to a current supplied from the constant current circuit 52.

The differential output circuit 54 includes Pch transistors MP1 and MP2, and outputs the signals DP and DM. The sources of the Pch transistors MP1 and MP2 are connected to the drain of the Pch transistor MP4 of the constant current circuit 52, and the drains of the Pch transistors MP5 and MP6 of the constant current variable adjustment part 53. The signal DM is output from the drain of the Pch transistor MP1. The signal DP is output from the drain of the Pch transistor MP2. The gates of the Pch transistors MP1 and MP2 are each connected to the output stage driver circuit 55.

The output stage driver circuit 55 outputs a data input signal to the differential output circuit 54. The two outputs of the output stage driver circuit 55 are connected to the gates of the Pch transistors MP1 and MP2 of the differential output circuit 54, respectively.

The terminating resistor part 56 includes resistors RS1 and RS2. The signal DP is pulled down by the resistor RS2. The signal DM is pulled down by the resistor RS1. Thus, the output levels of the signals DP and DM are determined by the values of the currents from the constant current circuit 52 and the constant current variable adjustment part 53, and the terminating resistor part 56.

The disconnection detector circuit 6 includes a comparator 61 and a D flip-flop (hereinafter, referred as DFF) circuit 62. The comparator 61 compares the differential signal amplitudes of data input to the signals DP and DM. The signal DP, the signal DM, the reference voltage VRS supplied from the sensitivity selector circuit 4, and a ground voltage VG supplied from the voltage divider circuit 3 are supplied to the four inputs of the comparator 61, respectively. A signal CO serving as the output of the comparator 61 is input to the data input of the DFF circuit 62. The DFF circuit 62 latches the signal CO by a latch timing signal LT and outputs a disconnection detecting signal LO.

Next, an operation of the communication device 100 is described. The communication device 100 switches the reference voltage VRS, which is supplied to the disconnection detector circuit 6, according to the variation of the constant current supplied to the differential output circuit 54. Thus, a ratio of the output level to the disconnection detecting sensitivity is consistently maintained constant.

The current value of the constant current variable adjustment part 53 and the reference voltage VRS are selected by setting the higher bit IUP1 and the lower bit IUP0 of the output level control signal IUP[1:0]. Note that a user (system designer) can set the output level control signal IUP[1:0] according to the setting of the communication device.

For example, when the output level control signal IUP[1:0] is set at "00", "00" is inverted by the inverters INV1 and INV2. As a result, "HIGH" is input to the gates of the Pch transistors MP5 and MP6. Therefore, the Pch transistors MP5 and MP6 turn off, so that only the current from the Pch transistor MP4, which turns on constantly, is supplied to the differential output circuit 54. At the same time, "HIGH" is input to only the two inputs of the logic circuit AND1 in the sensitivity selector circuit 4. Accordingly, "HIGH" is output from the output of the logic circuit AND1. "LOW" is output from the outputs of the logic circuits AND2 to AND4. Thus, the Nch transistor MN1 turns on. The Nch transistors MN2 to MN4 turn off. As a result, the voltage VR4 is selected as the reference voltage VRS.

When the output level control signal IUP[1:0] is set at "01", "LOW" is input to the gate of the Pch transistor MP5, so that the Pch transistor MP5 turns on. On the other hand, "HIGH" is input to the gate of the Pch transistor MP6, so that the Pch transistor MP6 turns off. Therefore, the differential output circuit 54 is supplied with the current from the Pch transistor MP5 as well as the current from the Pch transistor MP4. At the same time, "HIGH" is input to only the two inputs of the logic circuit AND2 in the sensitivity selector circuit 4. Accordingly, "HIGH" is output from the output of the logic circuit AND2. "LOW" is output from the outputs of the logic circuits AND1, AND3, and AND4. Thus, only the Nch transistor MN2 turns on. The Nch transistors MN1, MN3, and MN4 turn off. As a result, the voltage VR3, which is one-level higher than the voltage VR4, is selected as the reference voltage VRS.

When the output level control signal IUP[1:0] is set at "10", "HIGH" is input to the gate of the Pch transistor MP5, so that the Pch transistor MP5 turns off. On the other hand, "LOW" is input to the gate of the Pch transistor MP6, so that the Pch transistor MP6 turns on. Therefore, the differential output circuit 54 is supplied with the current from the Pch transistor MP6 as well as the current from the Pch transistor MP4. At the same time, "HIGH" is input to only the two inputs of the logic circuit AND3 in the sensitivity selector circuit 4. Accordingly, "HIGH" is output from the output of the logic circuit AND3. "LOW" is output from the outputs of the logic circuits AND1, AND2, and AND4. Thus, only the Nch transistor MN3 turns on. The Nch transistors MN1, MN2, and MN4 turn off. As a result, the voltage VR2, which is one-level higher than the voltage VR3, is selected as the reference voltage VRS.

When the output level control signal IUP[1:0] is set at "11", "LOW" is input to the gates of the Pch transistors MP5 and MP6. Therefore, the Pch transistors MP5 and MP6 turn on. Hence, the differential output circuit 54 is supplied the currents from the Pch transistors MP5 and MP6 as well as the current the current from the Pch transistor MP4. At the same time, "HIGH" is input to only the two inputs of the logic circuit AND4 in the sensitivity selector circuit 4. Accordingly, "HIGH" is output from the output of the logic circuit AND4. "LOW" is output from the outputs of the logic circuits AND1 to AND3. Thus, the Nch transistor MN4 turns on. The Nch transistors MN1 to MN3 turn off. As a result, the voltage VR1, which is one-level higher than the voltage VR2, is selected as the reference voltage VRS.

Figure 5:
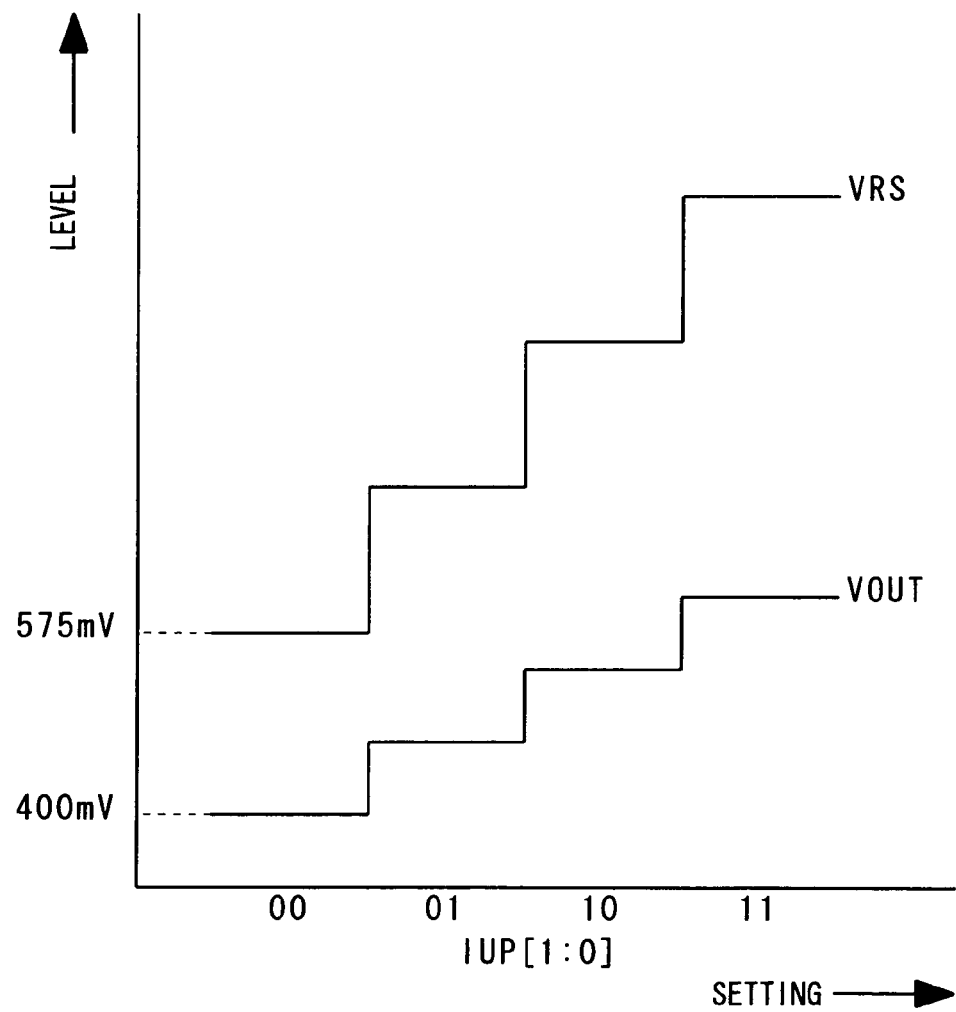
FIG. 5 is a graph showing variations of an output level VOUT and a reference voltage VRS according to an output level control signal IUP[1:0] in the communication device 100 when a receptacle side is terminated.

FIG. 5 is a graph showing variations of an output level VOUT and the reference voltage VRS according to the output level control signal IUP[1:0] in the communication device 100 when the receptacle side is terminated. The horizontal axis in FIG. 5 represents the setting of the output level control signal IUP[1:0]. The vertical axis in FIG. 5 represents the voltage levels of the output level VOUT and the reference voltage VRS with respect to each setting. When the output level control signal IUP[1:0] is set at "00", the communication device 100 operates in a similar manner to a well-known communication device. In this case, it is assumed that the output level of the differential output circuit 54 (the signals DP and DM constituting the pair of differential signals) is 400 mV and the reference voltage VRS is 575 mV. In the communication device 100, as shown in FIG. 2, the output level control signal IUP[1:0] is changed to "01", "10", "11", so that the output level VOUT can be increased and the reference voltage VRS can also be increased at a constant ratio according to an increase in the output level VOUT. Therefore, the output level VOUT never reaches the reference voltage VRS. Accordingly, misdetection of the disconnection can be appropriately prevented.

Further, if the gate width of the Pch transistor MP5 is set to be a half of the gate width of the Pch transistor MP6, the value of the current supplied from the Pch transistor MP5 can be a half of the value of the current supplied from the Pch transistor MP6. Thus, the value of the constant current supplied to the differential output circuit 54 can be increased at a constant rate according to the variation of the setting of the output level control signal IUP[1:0]. As a result, the operation shown in FIG. 5 can be achieved.

Therefore, according to the present configuration, the reference voltage VRS is maintained at level higher than the output level VOUT by the output level control signal IUP[1:0] when the receptacle is terminated. Thus, even if the output level in the receptacle is increased, the disconnection detecting signal LO is prevented from being erroneously output. Hence, according to the present configuration, it is possible to provide a communication device that can prevent the misdetection of the disconnection and achieve a high output level on the receptacle side.

Other Exemplary Embodiment

Figure 6:
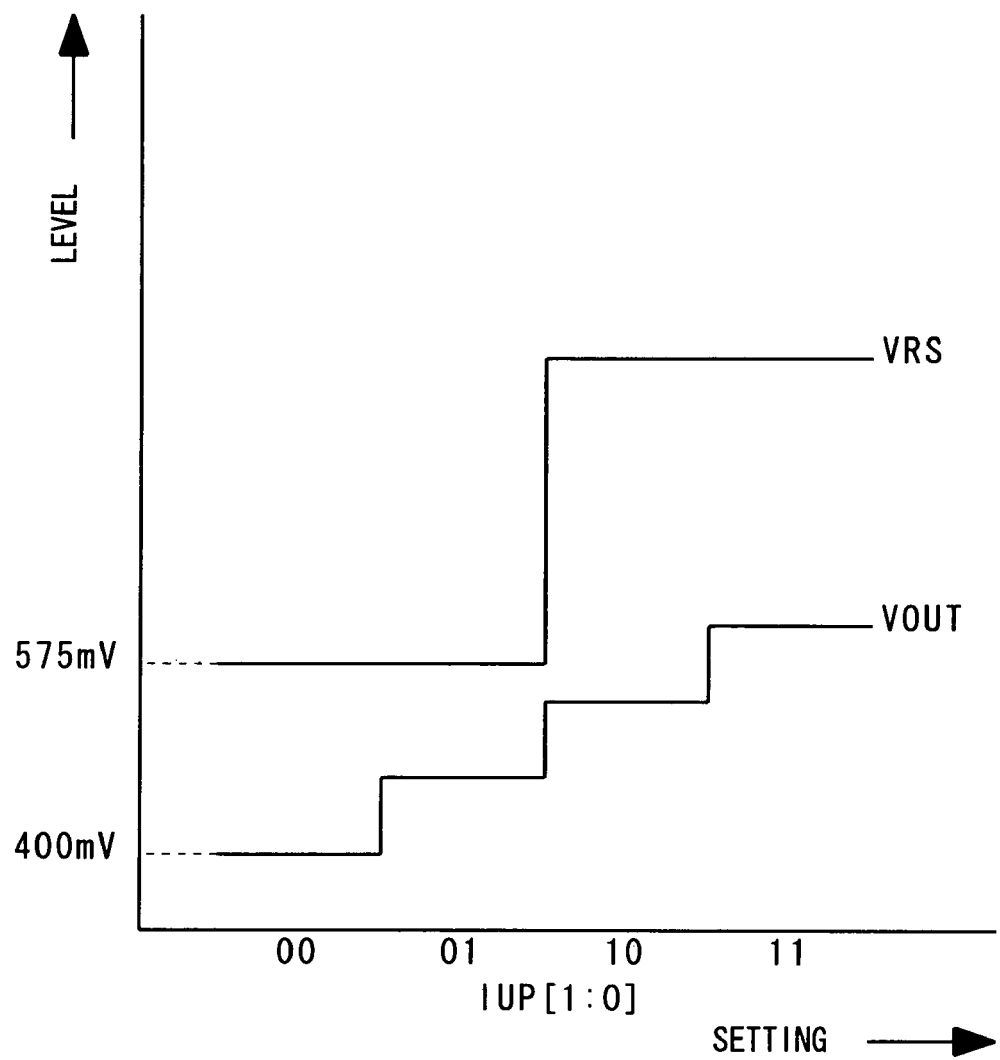
FIG. 6 is a graph showing the output level VOUT and the reference voltage VRS with respect to the output level control signal IUP[1:0] in the communication device 100 when the receptacle side is terminated and the reference voltage VRS is controlled by only a higher bit IUP1 of the output level control signal IUP[1:0]
Figure 7:
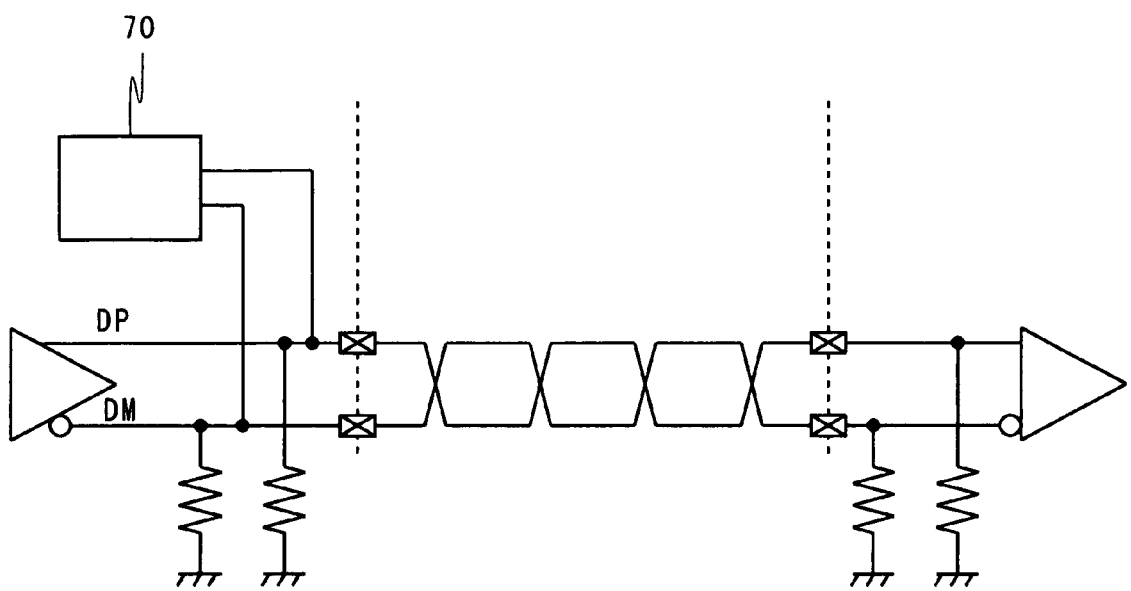
FIG. 7 is a block diagram showing a connection between a transmitting-side device and a receiving-side device in a HS mode of the USB 2.0 standard.
Figure 8:
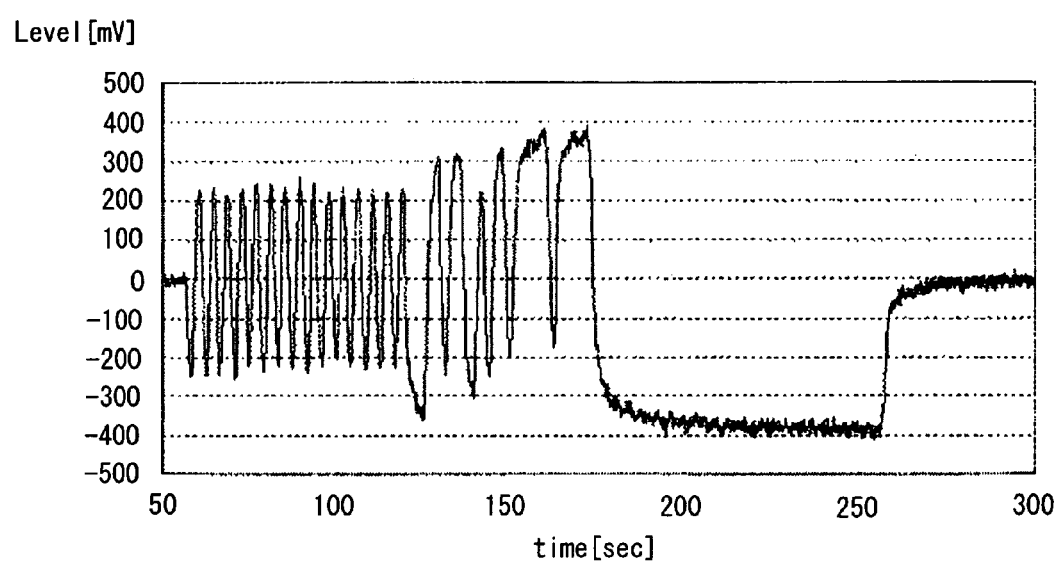
FIG. 8 is a graph showing a general waveform when a SOF (Start of Frame) packet is transmitted in a HS mode of a USB 2.0 standard.

The present invention is not limited to the exemplary embodiment described above, but may be changed as appropriate without departing from the spirit of the present invention. For example, the output level control signals input to the reference voltage generating circuit and the differential amplifier circuit may be different from each other. Specifically, for example, the reference voltage may be generated by inputting only the higher bit IUP1 of the output level control signal IUP[1:0] to the reference voltage generating circuit. This makes it possible to decrease the number of the inverters and the logic circuits receiving the lower bit IUP0 and reduce the size of the sensitivity selector circuit. FIG. 6 is a graph showing the output level VOUT and the reference voltage VRS with respect to the output level control signal IUP[1:0] in the communication device 100 when the receptacle side is terminated and the reference voltage VRS is controlled by only the higher bit IUP1 of the output level control signal IUP[1:0]. In this case, as shown in FIG. 6, although the number of steps at which the reference voltage VRS is changeable is decreased, the reference voltage VRS can be maintained at a level higher than the output level VOUT as in the case of FIG. 5.

The configurations of the inverter circuit part 1, the reference voltage generating circuit 2, and the differential amplifier circuit 5 are just examples. Needless to say, the operation of the present invention can also be achieved by other circuit configurations that can implement the same functions.

The output level control signal is two-bit control signal in the present configuration. However, it is possible to increase or decrease the number of changeable steps by increasing or decreasing the number of bits as needed and to adjust the ratio of variability by arbitrarily changing the circuit configuration.

Further, also in the case of squelch detection, squelch detection sensitivity (reference voltage) can be changed according to the variation of the current value of the differential amplifier circuit (variation of differential amplified voltage) by controlling the reference voltage generating circuit and the differential amplifier circuit. The user can set the output level according to a loss between the USB 2.0 output terminal and the USB 2.0 receptacle. Accordingly, it is considered that the input level (squelch) is attenuated between the USB 2.0 receptacle and the USB 2.0 output terminal in a similar manner to the output level. Hence, an apparent sensitivity is kept constant by setting the squelch detection sensitivity to a higher level at a constant ratio according to the current variation value of the output level. Therefore, it is possible to guarantee the loss value of the transmitting waveform from the communication device. Additionally, it is possible to receive the input waveform, the level of which satisfies the USB 2.0 standard, from the opposite device and to obtain an effect to accurately detect the squelch.

While the invention has been described in terms of several exemplary embodiments, those skilled in the art will recognize that the invention can be practiced with various modifications within the spirit and scope of the appended claims and the invention is not limited to the examples described above.

Further, the scope of the claims is not limited by the exemplary embodiments described above.

Furthermore, it is noted that, Applicant's intent is to encompass equivalents of all claim elements, even if amended later during prosecution.

What is claimed is:

1. A communication device comprising:
    a reference voltage generating circuit that outputs a reference voltage, the reference voltage changing according to a first control signal;
    a differential amplifier circuit that amplifies input signals and outputs the amplified signals as differential output signals to a receptacle, voltages of the differential output signals changing according to a second control signal; and
    a disconnection detector circuit that judges that the receptacle is opened and outputs a disconnection detecting signal when a differential amplitude voltage between the differential output signals is equal to or higher than the reference voltage,
    wherein the reference voltage generating circuit outputs the reference voltage that is larger than the differential amplitude voltage when the receptacle is terminated and that is smaller than the differential amplitude voltage when the receptacle is opened.

2. The communication device according to claim 1, wherein the first control signal is same as the second control signal.

3. The communication device according to claim 1, wherein a ratio of the differential amplitude voltage when the receptacle is terminated to the reference voltage is maintained constant.

4. The communication device according to claim 1, wherein
    the differential amplifier circuit comprises:
    a first constant current source that supplies a constant current; and
    a second constant current source that is connected in parallel to the first constant current source and is ON/OFF-controlled according to the second control signal.

5. The communication device according to claim 1, wherein
the reference voltage generating circuit comprises:
a voltage divider circuit that generates a plurality of divided voltages between a first constant voltage and a second constant voltage; and
a sensitivity selector circuit that outputs one of the plurality of divided voltages as the reference voltage based on the first control signal.

* * * * *